May 22, 1962  G. S. KNOX  3,035,808
PRESSURE RESPONSIVE VALVE
Filed Aug. 30, 1956  5 Sheets-Sheet 3
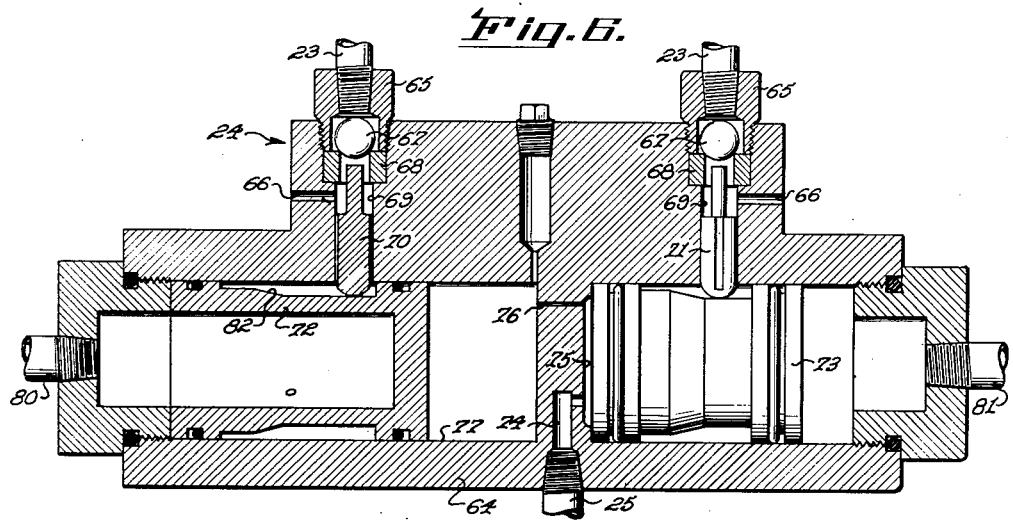
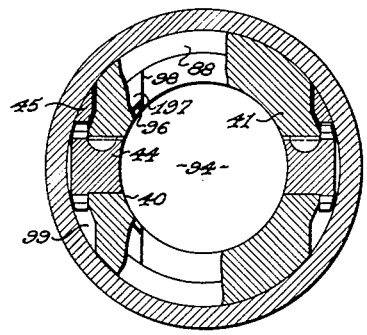
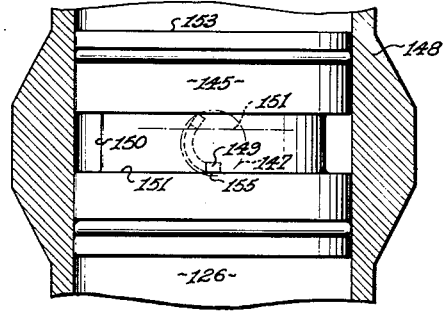
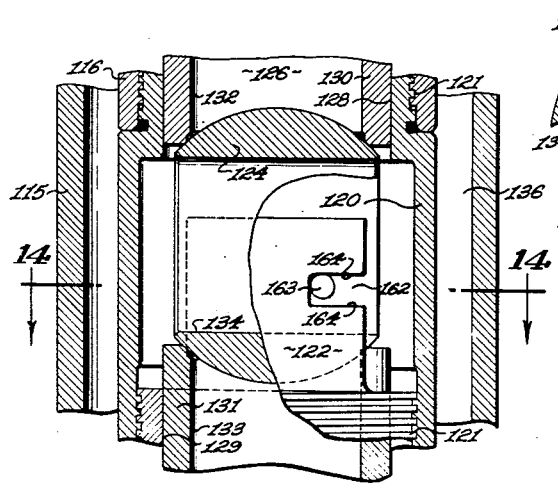
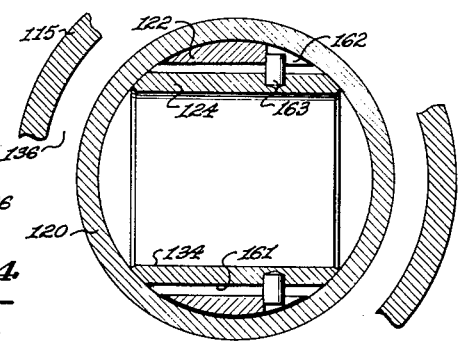
GRANVILLE S. KNOX
INVENTOR
BY
ATTORNEY

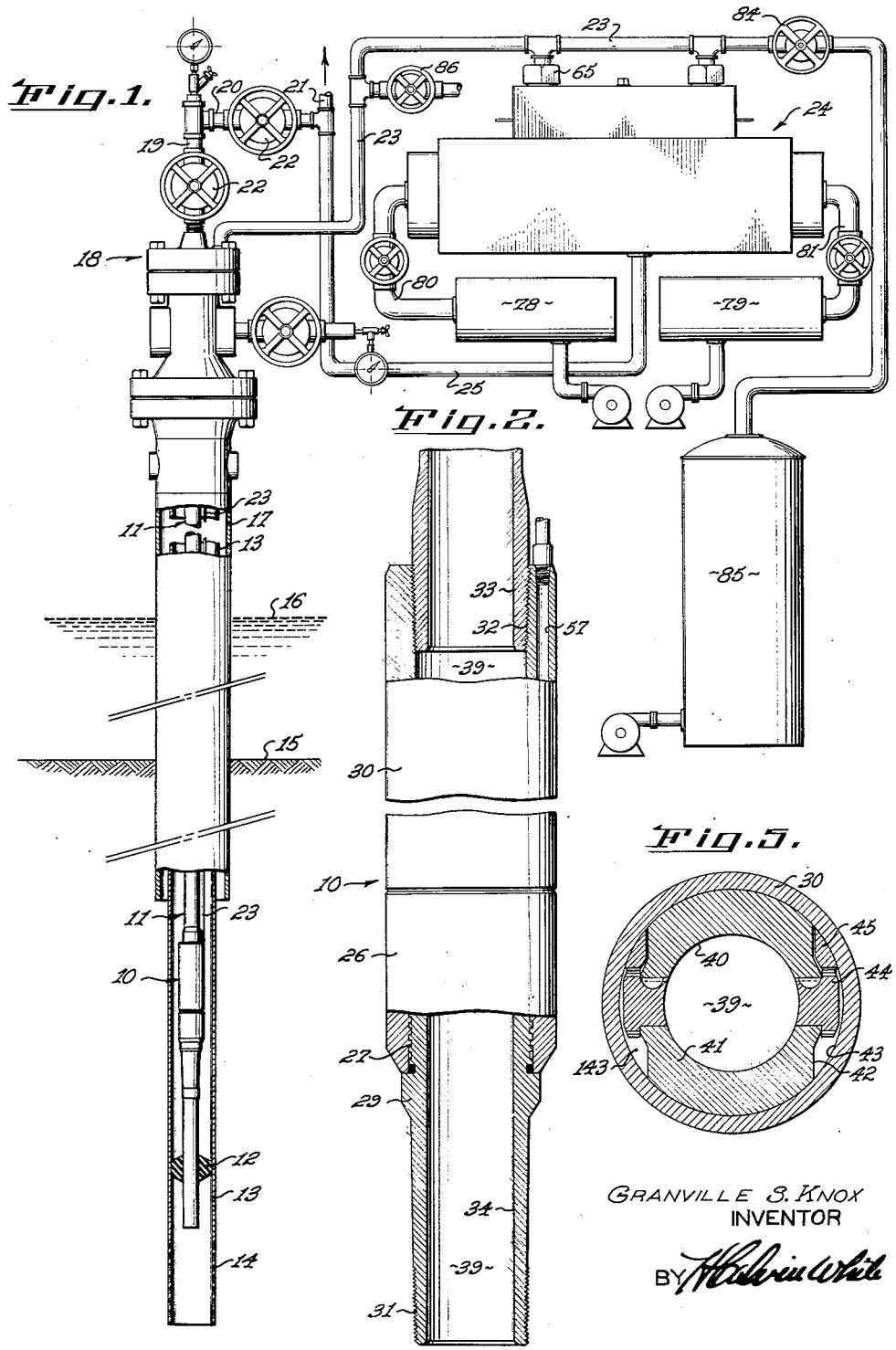

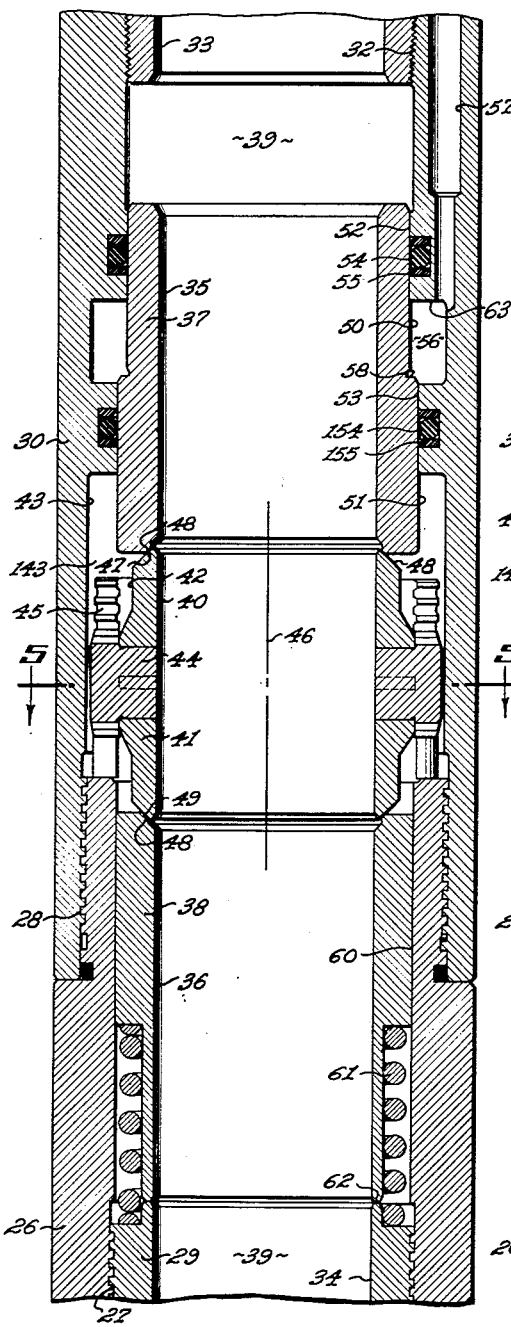
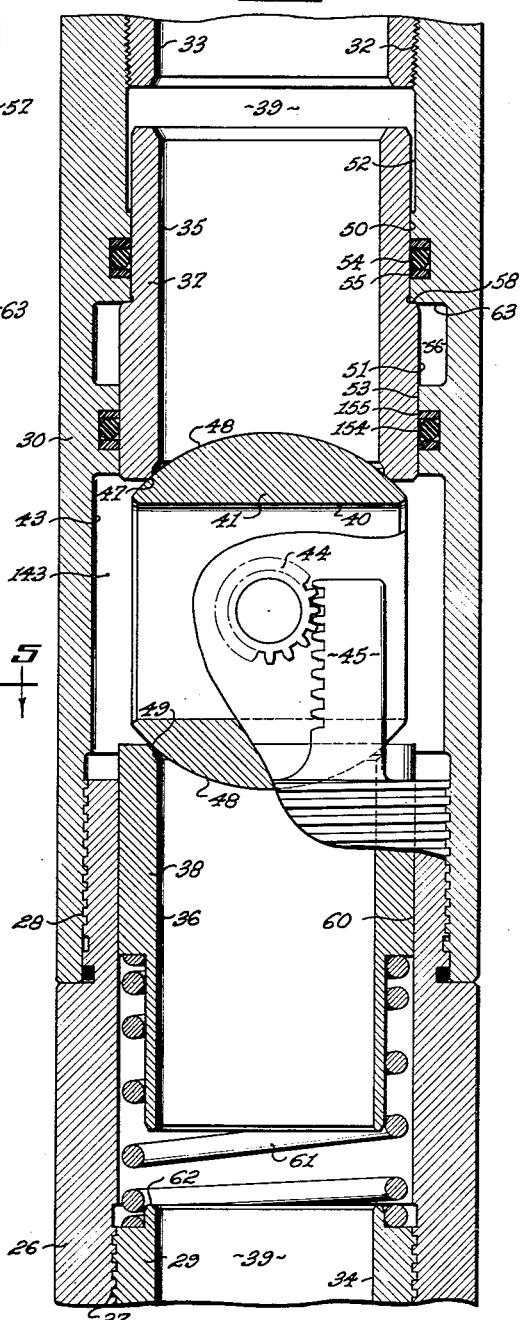

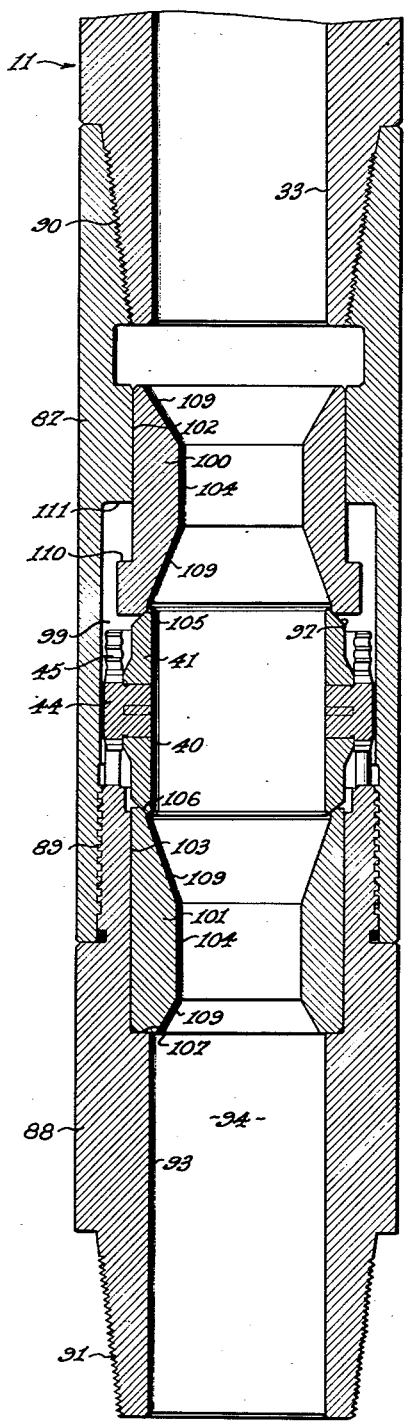
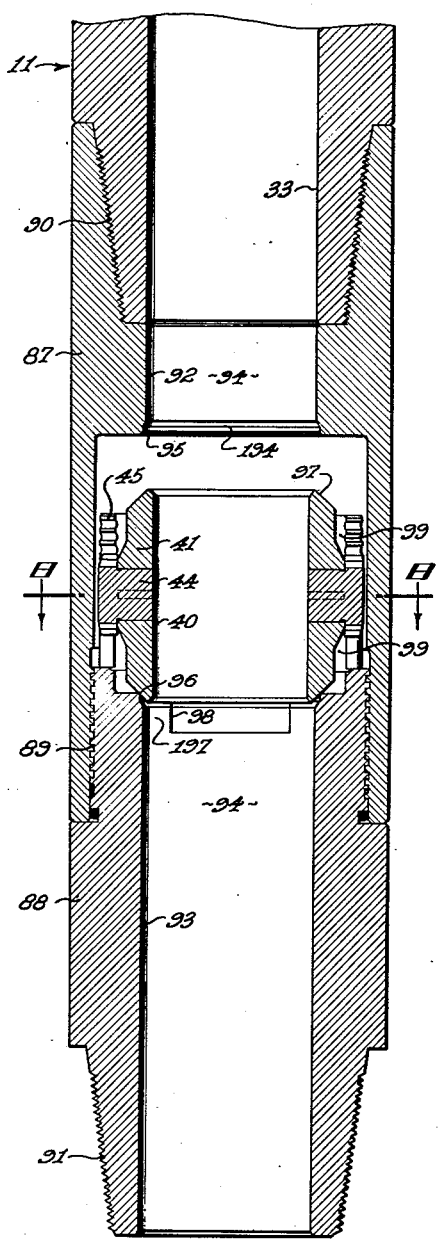
Granville S. Knox
INVENTOR

May 22, 1962  G. S. KNOX  3,035,808
PRESSURE RESPONSIVE VALVE
Filed Aug. 30, 1956  5 Sheets-Sheet 5

GRANVILLE S. KNOX
INVENTOR

BY
ATTORNEY

United States Patent Office 3,035,808
Patented May 22, 1962

3,035,808
PRESSURE RESPONSIVE VALVE
Granville S. Knox, Glendale, Calif., assignor to Hydril Company, Los Angeles, Calif., a corporation of Ohio
Filed Aug. 30, 1956, Ser. No. 607,159
33 Claims. (Cl. 251—62)

This invention relates generally to pressure responsive valves, and more particularly to valves capable of controlling flow through tubing, as for example the upward or downward flow of fluid through well tubing in response to control pressure exerted on the valve, the latter being so designed and arranged in relation to the size of the tubing that the valve is capable of freely passing the liquid flow as well as different instruments commonly lowered through a drill or tubing string, yet is enabled to shut off the flow in response to predetermined pressure application to the valve.

Under certain conditions encountered in drilling or operating a well it is desirable that fluid flow through the drill or production tubing be interrupted at a desired location in the well or at the surface, in such a manner that it may be later continued. For example, where a free flowing well is sunk in the ocean floor with a considerable length of tubing exposed to the water, it is desirable that production be automatically shut off below the ocean floor in the event that control of the flow pressure is lost as a result of damage to the well head or piping brought about by wave action or vessel collision therewith. Also, should the flow pressure at the surface increase beyond a predetermined safe maximum, the valve should be automatically or otherwise operable to close off the flow from the well.

The use of such a one-way valve is additionally important in those instances where a drill string is being run into the well against hydrostatic pressure. The valve in its shut condition operates to prevent upward mud flow in the string past the valve location near the lower end of the string, while being openable either automatically or under the remote control of the operator to freely pass mud downwardly when circulation is resumed.

Among the principal difficulties encountered in providing satisfactory valves for service in the above mentioned drill and similar applications are the facts that drill tubing and tubing joints are necessarily relatively thin walled, leaving little transverse space out of the path of the flow for the provision of the valve stopper and its actuating mechanism. The stopper must be capable of opening in such a way that it does not choke or diminish the passage diameter of the flow line to any appreciable extent so as to permit lowering of instruments through the tubing as well as free passage of liquid therethrough. It is also important, when the valve is open, that the sealing surfaces of the stopper and seat be positioned out of the flow stream to protect these surfaces from erosion and damage by sand and other coarse materials so often present in oil well drilling and production fluids. Yet, the valve stopper when closed must be of sufficient size to completely shut off the bore and maintain a tight seal against extremely high pressures.

With these requirements and limitations in mind, it is a major object of this invention to provide a pressure responsve valve insertible in a tubing string with flow passages in substantial alignment with the string bore, the valve including a stopper mounted for longitudinal bodily displacement in the passage and for rotation in response to such displacement, the latter being effected by application of pressure to the valve such as the differential pressure created by fluid flowing through the valve or a remote source of fluid pressure. Pressure application may be to the stopper itself or to means seating the stopper and longitudinally movable therewith, but in any event valve stopper rotation, bought about by pressure application, is effective to bring a through opening therein into and out of longitudinally unobstructed communication with the valve passages for controlling the flow therethrough. Thus, the valve is enabled to freely conduct the flow without obstructing it, and also to pass such equipment as plugs or temperature and pressure measuring instruments lowered through the string when the stopper opening is in longitudinal passage communication.

The invention contemplates the use of a plug stopper basically spherical in shape so that it may be appropriately cut away at opposite sides for mounting in the valve body to travel longitudinally and rotate therein, and for the provision of a maximum sized opening through the stopper for unobstructed communication with the valve passage and string bore. At the same time, the spherical stopper shape permits continuous seating thereagainst of one or more sleeves serving to protect the seating surfaces from the flow stream and movable longitudinally to displace the valve stopper and thereby effect rotation of the stopper opening, as will be described.

Other features and objects of the invention, as well as the details of an illustrative embodiment, will be more fully understood from the following detailed description of the drawings in which:

FIG. 1 is a vertical elevation sectioned and broken away in part to show the application of one form of the valve in a string of production tubing, together with the valve controller at the well head;

FIG. 2 is a vertical elevation broken away to show the manner of connection of the valve in FIG. 1 with the tubing;

FIG. 3 is a vertical elevation in section showing the details of construction of the valve in its open condition;

FIG. 4 is a section taken on an axial plane extending at right angles to the plane of FIG. 3 showing the valve in closed condition;

FIG. 5 is a section taken on line 5—5 of FIG. 3;

FIG. 6 is a vertical section taken through the controller shown in FIG. 1 and illustrating its construction;

FIG. 7 is a vertical elevation taken in section through a modified form of the invention;

FIG. 8 is a section taken on line 8—8 of FIG. 7;

FIG. 9 is a vertical section taken through another modified valve;

FIG. 12 is a section taken on line 12—12 of FIG. 11;

FIG. 13 is a vertical section taken through the stopper of FIG. 10 on an axial plane extending at right angles to the plane of FIG. 10 and showing the valve in closed condition; and FIG. 14 is a section taken on line 14—14 of FIG. 13.

Figure 10:
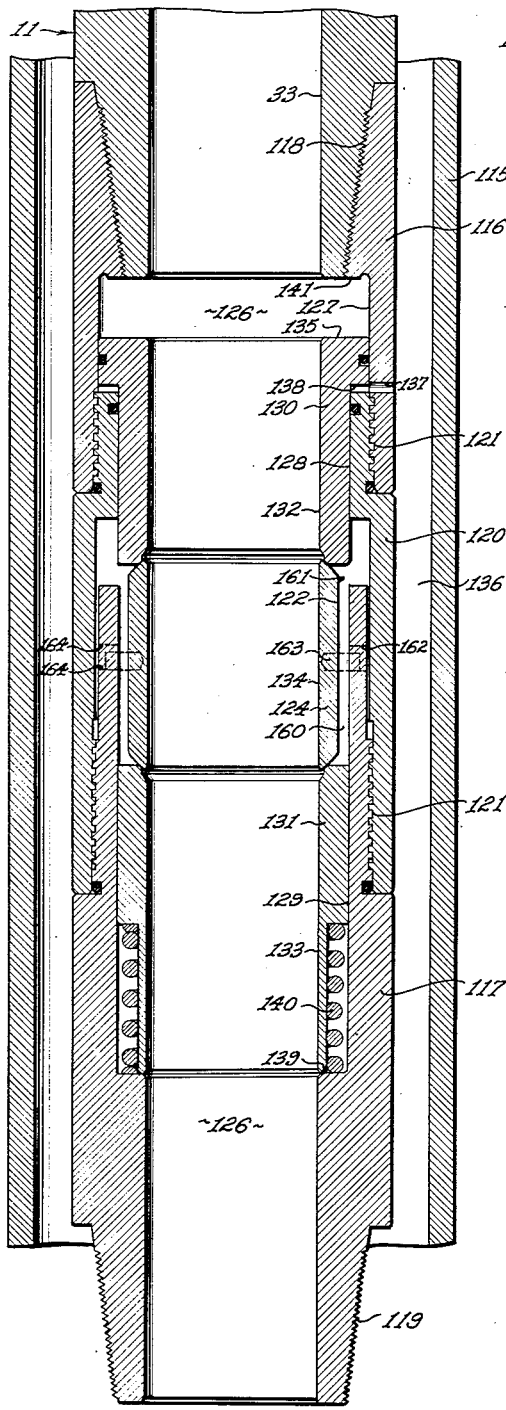
FIG. 10 is a vertical section taken through a modified form of the valve.

In FIG. 1 a safety valve 10 constructed in accordance with one form of the invention, as will be described in connection with FIGS. 3 and 4, is shown connected into a production tubing string 11 above a packer 12 sealing off between the lower end of the string and the casing 13, the bottom portion of which is perforated at 14 for receiving oil or gas in the production zone flowing upward through the string 11 under its own pressure. The valve is also shown typically located below the bottom 15 of the ocean or other body of water indicated at 16 so that in the event of rupture of the flow lines at the well head by wind, wave action, or vessel collision therewith timely operation of the valve in response to loss of flow pressure in the string above the valve will prevent costly and otherwise undesirable fluid loss from the well.

The protective casing 17 projecting above the surface of the ocean mounts the well head fittings generally indicated at 18 serving to cap the well and control upward flow through lines 19, 20 and 21 at desired output rates and pressures, as controlled by valves 22.

A line 23 running from the controller, generally indicated at 24, through the fitting 18 and downwardly within inner casing 13 to the valve 10 conducts actuating pressure to the valve in order to hold it open, so that oil and gas may flow upwardly through the string as long as the pressure in line 23 is maintained. Should the pressure in line 23 be released either by breakage thereof, or as a result of operation of the controller in response to the lowering or raising of the production flow pressure in line 21 below or above a predetermined minimum or maximum communicated to the controller through line 25, the valve 10 will shut off the flow in the manner to be described.

Referring now to the details of construction of the safety valve 10, it is shown in FIGS. 2 through 5 to include a body 26 connected by threads 27 and 28 respectively with lower and upper subs 29 and 30 forming pin and box connections at 31 and 32 enabling the valve to be connected directly into a tubing string. The subs are externally sized to have as small a diameter as possible so that the inclusion of the valve in the string will not interfere with raising and lowering of the string nor in some instances with the flow of fluid between the string and inner casing 13. As shown in FIGS. 2 through 4 the string bore 33 is substantially diametrically coextensive with bore 34 of the lower sub and also with bores 35 and 36 of upper and lower sleeves 37 anud 38 coaxially received within the elongated passage 39 formed by the upper and lower subs as well as with a through bore 40 formed within a plug stopper 41 mounted axially between the two sleeves.

While the stopper is generally of spherical form, its laterally opposite sides are cut away externally to provide two opposite parallel planar surfaces 42 spaced from the upper sub counterbore 43 for the reception in the opposite spaces 143 of opposite pinions 44 integrally carried by the stopper, the common axis of the two pinions extending perpendicular to the longitudinal axis of the valve. The pinions respectively mesh with longitudinally extending racks 45 integral with the body 26 and extending within the above mentioned spaces 143 between the planar stopper sides 42 and the upper sub counterbore 43. Thus, if the stopper is bodily longitudinally displaced in the direction of the valve axis 46, the rack and pinion mechanism will cause the stopper to rotate between the positions shown in FIGS. 3 and 4 wherein the stopper bore is respectively in and out of passage communication. In the latter condition, the spherical surface 48 of the stopper obstructs or blocks all flow through the valve, whereas in the former condition the stopper bore 40, open to substantially the same size as passage 39 and string bore 33, freely passes well tools and fluid flow since the stopper bore is in longitudinally unobstructed communication with the main valve passage as well as with the string bore.

The upper sleeve 37 has a smooth annular seating surface 47 radially outwardly offset from the sleeve bore 35 and in seating engagement with the spherical surface 48 of the stopper. Since the stopper bore rotates in an axial plane normal to the plane of FIG. 3, surfaces 47 and 48 remain in seating engagement throughout longitudinal displacement of the stopper and sleeve 37. This same relationship is true with respect to the stopper surface 48 in engagement with the annular seating surface 49 of the lower sleeve 38, and as a result the rack and pinion mechanism remains out of direct communication with the stopper and sleeve bores 35, 36 and 40 so that sediment carried upwardly or downwardly therethrough will not come in contact with said mechanism.

The two outer cylindrical surfaces 50 and 51 of the upper sleeve remain respectively in sliding engagement with bores 52 and 53 formed by the upper sub and house typical rubber O-rings 54 and 154 and tetrafluoroethylene back-up rings 55 and 155 for the O-rings so as to seal off an intermediate annular pressure chamber 56 formed between the sleeve and the upper sub from communication with the passage 39. Fluid pressure communicated to this chamber through a duct 57 formed in the upper sub, and to which line 23 described above is connected, is applied to annular sleeve shoulder 58 tending to urge the sleeve downwardly, longitudinally displacing the stopper and thereby rotating its bore into open position.

Opposed to the action of the pressure urged upper sleeve described immediately above is that of the lower sleeve 38 slidably received within the bore 60 formed by body 26 and yieldably urged upwardly by a compression spring 61 tending to longitudinally displace the stopper upwardly to closed condition. The limits of longitudinal travel of the stopper and sleeves are defined by stopper engagement with the lower sleeve when the latter engages the lower sub at 62 and by stopper engagement with the seating shoulder 58 of the upper sleeve when it in turn engages the upper sub shoulder 63, the rack and pinion being sized to fully rotate the stopper between open and closed positions within these longitudinal displacement limits. It is apparent that sufficient fluid pressure applied to upper sleeve shoulder 58 will displace the stopper and both sleeves downwardly against the force of the spring and the friction of the relatively sliding parts. In the absence of sufficient fluid pressure application to the sleeve shoulder 58, the spring will urge stopper and sleeves upwardly, effecting rotation of the spherical stopper surface into seating engagement with upper sleeve shoulder so that the stopper body blanks the sleeve bore or port 35.

Referring now to the construction of the controller 24 shown in FIGS. 1 and 6, it includes a body 64 into which a pair of ball check fittings 65 are threaded for connecting control line 23 with a pair of vents 66 when ball valves 67 are lifted from valve seats 68 in chambers 69. Plungers 70 and 71 resting on pistons 72 and 73 are movable in the chambers 69 by the pistons to lift the balls 67 off their seats allowing escape or loss of pressure in line 23 through the vents whenever the flow pressure in line 25 communicated to the controller exceeds a predetermined maximum or drops below a predetermined minimum.

For the above purposes, the flow line pressure is communicated through inlet 74 to the bore 75 within which piston 73 is reciprocable, and then through constricted passage 76 to the bore 77 within which piston 72 is reciprocable. The opposite ends of the pistons 72 and 73 respectively receive minimum and maximum control pressure from gas storage bottles 78 and 79 conducted through lines 80 and 81, the differential between these pressures corresponding to the range of flow line pressures required to keep pistons 72 and 73 at their leftward limits of travel in bores 77 and 75. With the pistons in these positions the plungers 70 and 71 are out of engagement with balls 67 so that the control pressure in line 23 remains unaffected and valve 10 is held in open condition. However, if the flow line pressure drops below a predetermined minimum as a result of rupture of lines 19, 20 and 21 or if the flow line pressure increases above a predetermined maximum, pistons 72 or 73 as the case may be will be pressure displaced rightwardly with the result that a piston cam 82 will lift a plunger 70 or 71 sufficiently to raise a ball valve 67 and vent the pressure in line 23 to the atmosphere, thus causing the safety valve 10 to close, as has been described.

Since the pistons have capacity for some movement prior to their cam engagement with the plungers, there will be some delay in operation accommodating minor short lived fluctuations in flow line pressure between the predetermined high and low limits. The constriction 76 furthermore dampens out surges in flow line pressure, lessening the effect of pressure fluctuations on the low pressure piston, the operating sensitivity of which is usually greater than that of the high pressure piston due to its operation at lower pressure. If, however, substantially all flow line pressure is lost as by rupture of the flow line, a rapid and complete venting of the control pressure in line 23 occurs so that the safety valve immediately closes.

If the operator wishes to independently control closing of the safety valve, he may do so by closing valve 84 between pressure supply tank 85 and line 23, and opening vent valve 86. Control pressure in line 23 after venting may be re-established by closing vent valve 86 and reopening valve 84 to admit pressure from supply tank 85 to the line 23.

Referring now to FIGS. 7 and 8, a modified form of the flow control valve is shown to include upper and lower subs 87 and 88 joined at 89 and respectively forming box and pin threads at 90 and 91 for connecting the valve into a drill string with the sub bores 92 and 93 substantially diametrically coextensive with the string bore 33. Valve stopper 41 is mounted by the rack and pinion mechanism 45 and 44 as previously described for longitudinal travel between upper valve seat 95 and lower seat or limit 96 formed by the upper and lower subs, respectively.

While the upper seat 95 extends annularly about port 194 in passage 94 for annular engagement with the spherical seating surface portion 97 of the stopper, the lower stop or limit is formed by a pair of opposite annular segments 197, as shown in FIG. 8, and the upper portion of the lower sub which would otherwise complete the annulus is cut away at 98 so that when the stopper has been moved downwardly, by gravity or by downwardly flowing fluid, into seating engagement with segmented stops 197 the downward flow may flush sediment, which might otherwise settle outside the stopper in the passages 99 between the stopper and upper sub and over the rack and pinion mechanism, into the passage 94 below the stopper through the openings 98.

On the other hand, when fluid flow pressure is exerted upwardly under the stopper, it carries the stopper upwardly into annular seating engagement with seat 95 to close off all upward flow through the valve since the stopper bore 40 is then out of communication with port 194.

The pressure differential available to longitudinally displace the stopper upwardly is increased somewhat by making the stopper bore 40 somewhat smaller than bores 92 and 93. This increases the fluid velocity through the stopper and thereby increases the velocity head, or static pressure, which is exerted against the cross sectional area of the stopper exposed to the flow stream. The effective open flow passage through stopper bore 40 steadily decreases as the valve stopper begins to rotate to closed position and the cross sectional area of the stopper exposed to the flow stream increases. The result is a steadily increasing static pressure which is then effective against a steadily increasing cross sectional area of the stopper thereby causing an accelerated upward movement of the stopper to the fully closed position. This valve will find application as a check valve inserted into a tubing or drill string to pass downward flow of fluid, while closing off any reverse or upward flow, as is often desired during oil well drilling operations.

Another similar valve is shown in FIG. 9 to include in addition to the elements described in FIG. 7 a pair of sleeves 100 and 101 respectively upstream and downstream of the valve stopper 41 and longitudinally movable in passage 94 with sliding engagement against enlarged bores 102 and 103 of the upper and lower subs. The sleeves have annular seats 105 and 106 which remain in engagement with the spherical surface 97 of the stopper throughout stopper longitudinal displacement and rotation so as to seal off space 99 from the flow through passage 94, thereby keeping the rack and pinion mechanism free from contact with any foreign particles or sediment carried by the flow stream. This valve is also contemplated as usable in a drill or tubing string to control back flow.

Both sleeves 100 and 101 have slightly reduced bores 104, as respects relatively larger diametrically equal bores 40, 33 and 93 of the stopper, string and lower sub respectively, so that the static pressure differential of the flow in either direction through the sleeves acting on the sleeve opposite tapers 109 effects sleeve displacement in the flow direction. As a result, when the flow is downward the lower sleeve is displaced downwardly until it strikes shoulder 107 formed by the lower sub, the flow pressure differential exerted on upper sleeve at the same time acting to displace the upper sleeve downward so that the stopper remains in seating engagement with both sleeves during their travel. On the other hand, reverse flow upward through the valve acts against sleeve tapers 109, to lift the two sleeves and the stopper until the upper sleeve annular shoulder 110 strikes shoulder 111 formed by the upper sub 87.

The valve arrangement illustrated in FIGS. 10, 13 and 14 is particularly adapted for use as a drill pipe float valve operable to seal off the drill string bore above the valve when the pipe is run into a well against hydrostatic pressure therein, while being openable under the pressure of mud pumped downwardly through the string to establish circulation during drilling.

This valve, shown connected into a drill string lowered into casing 115, includes upper and lower subs 116 and 117 respectively forming box and pin connections 118 and 119, and joined by tubular body 120 at threaded connections 121. The lower sub includes a like pair of integral upstanding extensions 122 projecting into the spaces 160 between the flat stopper opposite sides 161 and the tubular body 120. Each extension contains a laterally extending notch or groove 162 loosely receiving a pin 163 carried by the stopper 124 in offset relation to the axis of rotation thereof, the pin being axially movable a short distance up and down in the notch between upper and lower side walls 164 thereof and laterally slidable back and forth in the notch as the stopper rotates.

Longitudinally slidable in the valve passage 126 against upper sub, body and lower sub bores 127, 128 and 129 respectively are a pair of sleeves 130 and 131, bores 132 and 133 of which together with the stopper bore 134 are open to substantially string bore size in unobstructed longitudinal communication with the string bore to freely pass the flow when the stopper is in the down position, as illustrated.

When the stopper is displaced downwardly by upper sleeve 130, it does not begin to rotate until pins 163 travel downward into engagement with lower side wall 164 of the groove, so that frictional resistance to stopper rotation is not encountered until the sleeves and stopper have begun their downward displacement. Further, such frictional resistance to rotation is readily overcome by sudden torque application to the stopper as pins 163 strike lower groove wall 164, the momentum of the moving assembly preventing stoppage thereof as the increased load resulting from the initiation of stopper rotation is picked up. Upward movement of the stopper and sleeve assembly is facilitated in a similar manner, by effecting stopper rotation only after the pins 163 are displaced upwardly into engagement with the upper groove side 164. The lateral extent of the groove accommodates lateral movement of the pins therein as the stopper is moved up and down relative to the groove.

The stopper is displaced into its down position with its bore 134 in unobstructed passage communication by the upper sleeve 130 when fluid is pumped downwardly through passage 126 so that fluid pressure is exerted against the upper end face 135 of sleeve 130. At the same time, the reduced pressure of fluid such as drilling mud passing upwardly in the annular space 136 between the valve and the casing 115 is communicated through upper sub port 137 to annular under face 138 of the upper sleeve. Therefore, the pressure differential exerted on the upper sleeve when fluid is pumped downwardly through the valve is always sufficient to displace the upper sleeve, stopper 134 and lower sleeve 131 downwardly until the lower end of the latter strikes shoulder 139 formed by the lower sub.

A compression spring 140 shouldered at 139 against the lower sub and bearing against the lower sleeve acts to yieldably resist downward displacement of the stopper and sleeves, permitting downward displacement of these elements under the pressure of the downwardly pumped flow. On the other hand, when circulation is stopped, spring 140 urges the two sleeves and stopper upwardly until the end face 135 of the upper sleeve strikes upper sub shoulder 141, at which time the stopper bore 134 has rotated out of communication with passage 126. With no downward circulation through the valve, the hydrostatic pressure of mud acting against sleeve 130 is in balance and the sleeve offers no resistance to the upward thrust of spring 140. The slidable seating action of the stopper against the two sleeves 130 and 131 remains the same as described in connection with FIGS. 2, 3 and 9.

Figure 11:
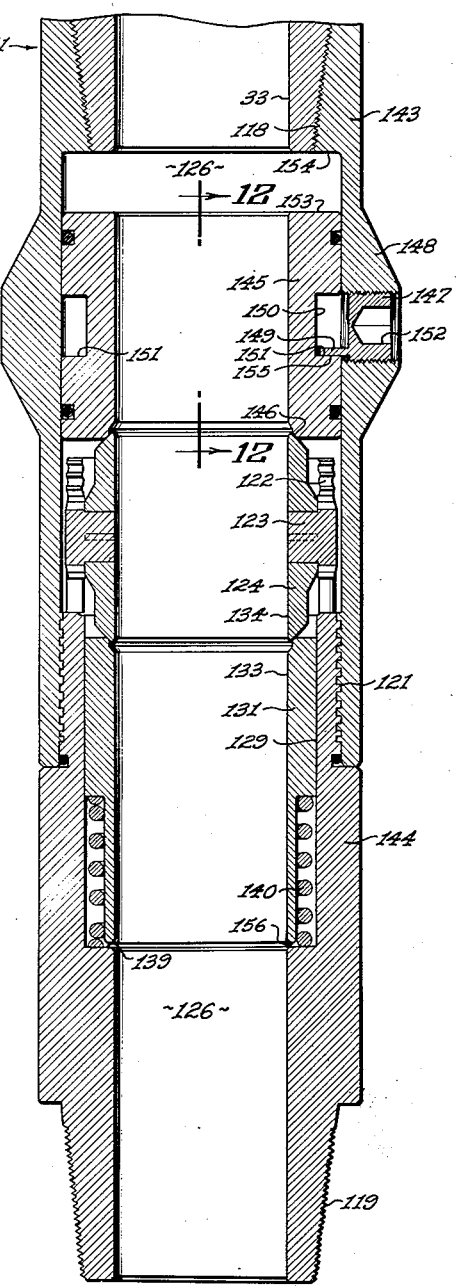
FIG. 11 is a vertical section taken through still another modified valve.

In FIGS. 11 and 12 is illustrated a similar type of valve usable at the upper end of the drill string at the well head as a kelly-cock valve. It includes upper and lower subs 143 and 144 mounting a stopper 124 and lower sleeve 131 with a spring 140 urging the lower sleeve and stopper upwardly in passage 126. The upper sleeve 145 which annularly seats the spherical surface portion 146 of the stopper is not necessarily fluid pressure responsive but is displaceable downwardly by rotation of a plug 147 threaded laterally into a smoothly tapered boss 148 formed on the upper sub, the plug including a lug 149 projecting into an annular recess 150 formed in the exterior of the upper sleeve. The lug bears against recess shoulder 151 so that upon plug rotation the lug is displaced upwardly or downwardly in the recess, by virtue of its off-center location with respect to the axis of plug rotation, permitting upward and downward sleeve displacement with the lug, the spring 140 acting through the lower sleeve and stopper to urge the upper sleeve into shouldered engagement with the lug at all times. Therefore, it is evident that an operator may control the valve merely by inserting a wrench into plug socket 152 and turning the plug in one direction to open the valve or in the opposite direction to shut the valve. The upper closed position of the stopper is established by engagement of the upper sleeve face 153 against upper sub shoulder 154.

The valve is conveniently held in open condition, against closure as by inadvertent rotation of plug 147, by providing lug 149 with a flat contact face 155 for engagement with recess shoulder 151. The upward thrust of spring 140 tends to hold shoulder 151 securely against the flattened face of the lug to thereby prevent rotation of plug 147 except by manual operation with a suitable wrench. In this condition, there is a slight clearance 156 between the lower end of the lower sleeve 131 and shoulder 139 on the lower sub so that as the flat surface of the lug is turned out of contact with recess shoulder 151 the upper sleeve may move slightly downwardly as the flat surfaces move out of parallel and thereafter move upwardly with the lug.

In various forms of the invention, as for example FIGS. 1, 3 and 4, the stopper in its different positions is surrounded by fluid confining imperforate wall extent which blocks escape therethrough of fluid from within the passage enlargement to the outside of the string. See for example the imperforate counterbore 43 in FIGS. 3 and 4. Accordingly, fluid cannot escape into the casing 13 above the packer 12, as seen in FIG. 1. Also, it will be clear that the seat and limit, as for example are seen at 47 and 49 in FIG. 3, have or form flow ports of substantially the same capacity as the flow passages 33 and 34.

I claim:

1. A valve, comprising a valve body connectible in a flow line, tubular means having a passageway therethrough and sealably slidable longitudinally within the valve body, seat means across said tubular means, a valve member having an opening therethrough of a diameter substantially equal to the diameter of said passageway and seatable on the seat means for opening and closing the passageway upon rotation about an axis disposed transversely to the opening therethrough, means for urging said tubular means into seated engagement with said valve member, and means for rotating said valve member between opened and closed positions while concurrently moving it longitudinally of the valve body.

2. In a check valve, a housing; inlet and outlet flow ports to said housing; a valve seat about each port; a valve ball rotatably disposed in the housing, the said valve seats being spaced apart a distance greater than the diameter of a circle defined by the intersection of the valve ball by a plane tangent to both seats, said ball having a concentric flow passage therethrough, the said ball being movable between the valve seats in response to fluid pressure exerted thereagainst; and cooperating gear means between the housing and the ball on which the ball may rotate between the seats, the said gear means being offset with respect to the axis of rotation of the valve ball; and the said passage being arranged to coincide with the outlet port in one position, and the solid side of the ball being arranged to close the inlet port in the other position, said housing having fluid confining wall extent about the ball to block escape therethrough of fluid from within the housing to the outside thereof in all positions of ball movement between said seats.

3. An improved valve comprising housing means forming a longitudinally extending flow passage and a passage enlargement, a valve stopper within the enlargement, said means including a valve stopper seat forming a port through which said flow is adapted to pass and a valve stopper limit longitudinally spaced from said seat, said stopper being bodily movable longitudinally of the enlargement and along a straight path between said seat and limit in response to force application to the stopper, said stopper having a body portion and a through opening and being rotatable in opposite directions to predetermined locations bringing said body portion and through opening alternately into flow blanking relation and flow passing communication with said port, means within said enlargement for so rotating the stopper in response to said longitudinal movement thereof, the entirety of said enlargement forming means having fluid confining wall extent to block escape therethrough of fluid from within said enlargement to the outside of said housing means and in all locations of said stopper.

4. An improved valve comprising tubular means forming a longitudinally extending flow passage and a passage enlargement, a valve stopper within the enlargement, said means including an annular valve stopper seat forming a port through which said flow is adapted to pass and a valve stopper limit longitudinally spaced from said seat, said stopper having a body portion and a through opening and being rotatable in opposite directions to predetermined locations bringing said body portion and through opening alternately into flow blanking relation and flow passing registration with said port, said stopper and enlargement forming means having lateral clearance therebetween, and means within said clearance for so rotating the stopper in response to said longitudinal movement thereof, the entirety of said tubular means forming said enlargement having fluid confining wall extent to block escape therethrough of fluid from within said enlargement to the outside of said tubular means and in all locations of said stopper.

5. An improved valve, comprising tubular means forming a longitudinally extending flow passage and a passage enlargement, a valve stopper within the enlargement, said means including an annular valve stopper seat forming a port through which said flow is adapted to pass and a valve stopper limit longitudinally spaced from said seat, said stopper being bodily movable longitudinally of the enlargement and along a straight path between said seat and limit in response to force application to the stopper, said stopper having a substantially spherical surface body portion and a through opening and being rotatable in opposite directions to predetermined locations bringing said body portion and through opening alternately into flow blanking relation and flow passing registration with said port, said stopper and enlargement forming means having lateral clearance therebetween, and means within said clearance for so rotating the stopper in response to said longitudinal movement thereof, the entirety of said tubular means forming said enlargement having fluid confining wall extent to block escape therethrough of fluid from within said enlargement to the outside of said tubular means and in all locations of said stopper.

6. An improved valve, comprising tubular means forming a longitudinally extending flow passage and a passage enlargement, a valve stopper within the enlargement, said means including an annular valve stopper seat forming a port through which said flow is adapted to pass and a valve stopper limit longitudinally spaced from said seat, said stopper being bodily movable longitudinally of the enlargement and along a straight path between said seat and limit in response to force application to the stopper, said stopper having a substantially spherical surface body portion and a through opening and being rotatable in opposite directions to predetermined locations bringing said body portion and through opening alternately into flow blanking relation and flow passing registration with said port, said through opening having a cross sectional area at least substantially as large as that of said flow passage upstream and downstream of the stopper, said stopper and enlargement forming means having lateral clearance therebetween, and means within said clearance for so rotating the stopper in response to said longitudinal movement thereof, the entirety of said tubular means forming said enlargement having fluid confining wall extent to block escape therethrough of fluid from within said enlargement to the outside of said tubular means and in all locations of said stopper.

7. An improved valve, comprising tubular means forming a longitudinally extending flow passage and having a longitudinally extending cylindrical inner wall forming a passage enlargement, a valve stopper within the enlargement, said means including an annular valve stopper seat forming a port through which said flow is adapted to pass and a valve stopper limit longitudinally spaced from said seat, said stopper being bodily movable longitudinally of the enlargement and along a straight path between said seat and limit in response to force application to the stopper, said stopper having a substantially spherical surface body portion and a through opening and being rotatable in opposite directions to predetermined locations bringing said body portion and through opening alternately into flow blanking relation and flow passing registration with said port, said stopper and enlargement forming means having lateral clearance therebetween, and means within said clearance for so rotating the stopper in response to said longitudinal movement thereof, the entirety of said inner wall being imperforate and fluid confining to block escape of fluid from said enlargement to the exterior in all locations of said stopper.

8. An improved valve, comprising means forming a longitudinally extending flow passage, a passage enlargement, a valve stopper within the enlargement, said means including an annular valve stopper seat forming a port through which said flow is adapted to pass and a valve stopper limit longitudinally spaced from said seat, said seat and limit each being longitudinally movable, said stopper being bodily movable longitudinally of the enlargement and along a straight path between said seat and limit in response to force application to the stopper, said stopper having a substantially spherical surface body portion and a through opening and being rotatable in opposite directions to predetermined locations bringing said body portion and through opening alternately into flow blanking relation and flow passing registration with said port, and means for so rotating the stopper in response to said longitudinal movement thereof, said limit and seat engaging the stopper during longitudinal movement and rotation thereof.

9. An improved valve, comprising means forming a longitudinally extending flow passage, a passage enlargement, a valve stopper within the enlargement, said means including an annular valve stopper seat and an annular valve stopper limit longitudinally spaced from said seat, said limit and seat having flow ports of substantially the same capacity as said longitudinally extending flow passage, said stopper being bodily movable longitudinally of the enlargement and along a straight path between said seat and limit in response to force application to the stopper, said stopper having a body portion containing a through opening and being rotatable in opposite directions to predetermined locations bringing said body portion and through opening alternately into flow blanking relation and flow passing registration with said ports and passage, said stopper and enlargement forming means having lateral clearance therebetween, means within said clearance for so rotating the stopper in response to said longitudinal reciprocation, said limit and seat both being bodily movable longitudinally in the passage.

10. An improved valve, comprising means forming a longitudinally extending flow passage, a passage enlargement, a valve stopper within the enlargement, said means including an annular valve stopper seat and an annular valve stopper limit longitudinally spaced from said seat, said seat and limit forming ports through which said flow is adapted to pass, said stopper having a body portion containing a through opening and being rotatable in opposite directions to predetermined locations bringing said body portion and through opening alternately into flow blanking relation and flow passing registration with said ports and passage, said stopper and enlargement forming means having lateral clearance therebetween, and means within said clearance for rotating the stopper in response to said longitudinal reciprocation, said limit and seat being independently bodily movable longitudinally in the passage, said limit and seat flow ports having substantially the same capacity as said longitudinally extending flow passage, the means forming one of said limit and seat being independently movable toward the stopper in response to fluid pressure application thereto.

11. An improved valve, comprising means forming a longitudinally extending flow passage, a passage enlargement, a valve stopper within the enlargement, said means including an annular valve stopper seat and an annular valve stopper limit longitudinally spaced from said seat, said seat forming a port through which said flow is adapted to pass, said stopper being bodily movable longitudinally of the enlargement and along a straight path between seat and limit in response to force application to the stopper, said stopper having a body portion containing a through opening and being rotatable in opposite directions to predetermined locations bringing said body portion and through opening alternately into flow blanking relation and flow passing registration with said port and passage, said stopper and enlargement forming means having lateral clearance therebetween, and means within said clearance for rotating the stopper in response to said longitudinal reciprocation, said limit and seat being independently bodily movable longitudinally in the passage, the means forming one of said limit and seat being independently movable toward the stopper in response to fluid pressure application thereto, and the means forming the other of said limit and seat being independently movable toward the stopper in response to spring pressure application thereto.

12. An improved valve, comprising tubular means forming a longitudinally and axially extending flow passage and having a longitudinally extending cylindrical inner wall forming a passage enlargement, a valve stopper within the enlargement, said means including an annular valve stopper seat and an annular valve stopper limit longitudinally spaced from said seat, said seat and limit having flow ports of substantially the same capacity as said flow passage, said stopper being bodily movable longitudinally of the enlargement and along a straight path between said seat and limit in response to force application to the stopper, said stopper having a spherical surface body portion containing a through opening and being rotatable about a lateral axis in opposite directions to predetermined locations bringing said body portion and through opening alternately into flow blanking relation and flow passing registration with said ports and passage, said stopper and inner wall having lateral clearance therebetween, and means within said clearance for so rotating the stopper in response to said longitudinal movement thereof, the entirety of said tubular means forming said enlargement having fluid confining wall extent to block escape therethrough of fluid from within said enlargement to the outside of said tubular means and in all locations of said stopper.

13. The combination, comprising casing in a well, a longitudinally extending well tubing string in the casing, tubular means connected into said string forming a longitudinally extending flow passage, a passage enlargement, a valve stopper within the enlargement, said means including an annular valve stopper seat forming a port through which said flow is adapted to pass and a valve stopper limit longitudinally spaced from said seat, said stopper being bodily movable longitudinally of the enlargement and along a straight path between said seat and limit in respone to force application to the stopper, said stopper having a body portion and a through opening and being rotatable in opposite directions to predetermined locations bringing said body portion and through opening alternately into flow blanking relation and flow passing registration with said port, said stopper and enlargement forming means having lateral clearance therebetween, means within said clearance for so rotating the stopper in response to said longitudinal movement thereof, means packing off between the string and casing below the level of said passage enlargement, the entirety of said tubular means forming said enlargement having fluid confining wall extent to block escape therethrough of fluid from within said enlargement to the outside of said tubular means and in all locations of said stopper.

14. The combination, comprising casing in a well, a longitudinally extending well tubing string in the casing, valve means connected into said string forming a longitudinally extending flow passage, a passage enlargement, a valve stopper within the enlargement, said means including an annular valve stopper seat forming a port through which said flow is adapted to pass and a valve stopper limit longitudinally spaced from said seat, said stopper being bodily movable longitudinally of the enlargement and along a straight path between said seat and limit in response to force application to the stopper, said stopper having a substantially spherical surface body portion and a through opening and being rotatable in opposite directions to predetermined locations bringing said body portion and through opening alternately into flow blanking relation and flow passing registration with said port and passage, said through opening and passage being open to at least substantially string bore size, said stopper and enlargement forming means having lateral clearance therebetween, means within said clearance for so rotating the stopper in response to said longitudinal movement thereof, means packing off between the string and casing below the level of said passage enlargement, the entirety of said tubular means forming said enlargement having fluid confining wall extent to block escape therethrough of fluid from within said enlargement to the outside of said tubular means and in all locations of said stopper.

15. The combination, comprising casing in a well, a longitudinally extending well tubing string in the casing, tubular means connected into said string forming a longitudinally extending flow passage and having a longitudinally extending cylindrical inner wall forming a passage enlargement, a valve stopper within the enlargement, said means including an annular valve stopper seat and an annular valve stopper limit longitudinally spaced from said seat, said limit and seat having flow ports of substantially the same capacity as said longitudinally extending flow passage, said stopper being bodily movable longitudinally of the enlargement and along a straight path between said seat and limit in response to force application to the stopper, said stopper having a spherical surface body portion containing a through opening and being rotatable about a lateral axis in opposite directions to predetermined locations bringing said body portion and through opening alternately into flow blanking relation and flow passing registration with said ports and passage, said through opening and passage being open to at least string bore size, said stopper and inner wall having lateral clearance therebetween, means within said clearance for so rotating the stopper in response to said longitudinal movement thereof, means packing off between the string and casing below the level of said passage enlargement, the entirety of said tubular means forming said enlargement having fluid confining wall extent to block escape therethrough of fluid from within said enlargement to the outside of said tubular means and in all locations of said stopper.

16. An improved valve comprising means forming a longitudinally extending flow passage and a passage enlargement, a valve stopper within the enlargement, said stopper being bodily movable longitudinally of the enlargement in response to force application thereto, said means including a valve stopper seat forming a port in said passage at one longitudinal side of the stopper, means within said enlargement for rotating the stopper between predetermined angular positions in response to concurrent bodily movement of the stopper longitudinally of the passage enlargement said stopper having a body portion extending in flow blanking relation with said port in one of said stopper positions and having a through opening in substantial longitudinal alignment with said port in the other of said stopper positions, said seat limiting movement of the stopper in a first longitudinal direction when the stopper is in said one angular position whereby the seat has a longitudinal location that determines said one angular position of the stopper, said seat being longitudinally movable.

17. The invention as defined in claim 12 in which said stopper opening is of substantially passage size.

18. The invention as defined in claim 12 comprising one stopper seat upstream of the stopper, and in which said limit comprises another stopper seat downstream of the stopper.

19. The invention as defined in claim 18 comprising an annular upstream seat toward which the stopper is movable in response to reverse flow through the valve and against which the stopper is adapted to seat with said body portion blanking said port to prevent reverse flow through the valve.

20. The invention as defined in claim 19 in which said stopper opening size is slightly less than passage size to produce sufficient differential flow pressure application on the stopper when said opening is in communication with said port and said reverse flow is passing through the stopper opening and then through the port that the stopper is moved in the reverse flow direction thereby rotating said opening out of registration with said port.

21. The invention as defined in claim 12 in which said tubular means includes a sleeve coaxially received within said passage for longitudinal movement toward the stopper in seating engagement therewith in response to pressure application on the sleeve.

22. The invention as defined in claim 12 in which said tubular means includes a pair of sleeves coaxially received within said passage upstream and downstream of the stopper for longitudinal movement toward the stopper in annular seating engagement therewith.

23. The invention as defined in claim 22 in which the sleeves have bores open to substantially passage size.

24. The invention as defined in claim 22 including stop shoulders on said tubular means respectively upstream and downstream of said upstream and downstream sleeves and engageable therewith for limiting sleeve longitudinal movement between said shoulders.

25. The invention as defined in claim 22 in which the upstream sleeve presents a surface in the upstream direction for receiving pressure application to move the upstream sleeve downstream toward the stopper.

26. The invention as defined in claim 25 in which the downstream sleeve presents a surface in the downstream direction for receiving pressure application of reverse flow to move said downstream sleeve upstream toward the stopper.

27. The invention as defined in claim 26 in which said downstream sleeve also presents a surface in the upstream direction for receiving pressure application, said downstream sleeve having a bore slightly less than passage size to produce sufficient differential flow pressure acting on said sleeve to displace it longitudinally in the flow direction.

28. The invention as defined in claim 25 including a spring yieldably urging said downstream sleeve in the upstream direction for holding the stopper in its upstream position with the stopper body portion blanking said port in the absence of full pressure application on the upstream sleeve surface.

29. The invention as defined in claim 28 in which said upstream sleeve surface is out of communication with said passage, and in which said tubular means contains a duct through which pressure other than from said flow is transmissible to said sleeve surface.

30. The invention as defined in claim 28 in which said upstream sleeve surface is out of communication with said passage, and including an element mounted by said tubular means for longitudinal displacement in engagement with said sleeve surface and manipulable from the valve exterior to move said upstream sleeve and stopper downstream in said passage thereby rotating said through opening into registration with said passage.

31. The invention as defined in claim 12 in which said means for rotating the stopper includes a rack and pinion respectively carried by said tubular means and stopper and intermeshing in offset relation with the stopper lateral axis of rotation for rotating the stopper.

32. The invention as defined in claim 12 in which said means for rotating the stopper includes a tongue and groove connection between said stopper and tubular means offset from the stopper axis of rotation for rotating the stopper.

33. The invention as defined in claim 32 in which said means for rotating the stopper includes a pair of longitudinally spaced shoulders carried by said tubular means and forming said groove, and said tongue is longitudinally movable in the groove between said longitudinally spaced shoulders whereby the stopper is rotatable by said connection only after the tongue has engaged one of said shoulders during said stopper longitudinal movement.

References Cited in the file of this patent

UNITED STATES PATENTS

| | | |
|---|---|---|
| 543,220 | Ross | July 23, 1895 |
| 2,125,330 | Brisbane | Aug. 2, 1938 |
| 2,238,609 | Sewell | Apr. 15, 1941 |
| 2,708,563 | Backman | May 17, 1955 |
| 2,908,330 | Fredd | Oct. 13, 1959 |
| 2,963,089 | Sizer | Dec. 6, 1960 |